Aug. 17, 1948.   B. J. CRAIG   2,447,397
VEHICLE COMPARTMENT HOOD AND FENDER
Original Filed Feb. 12, 1940
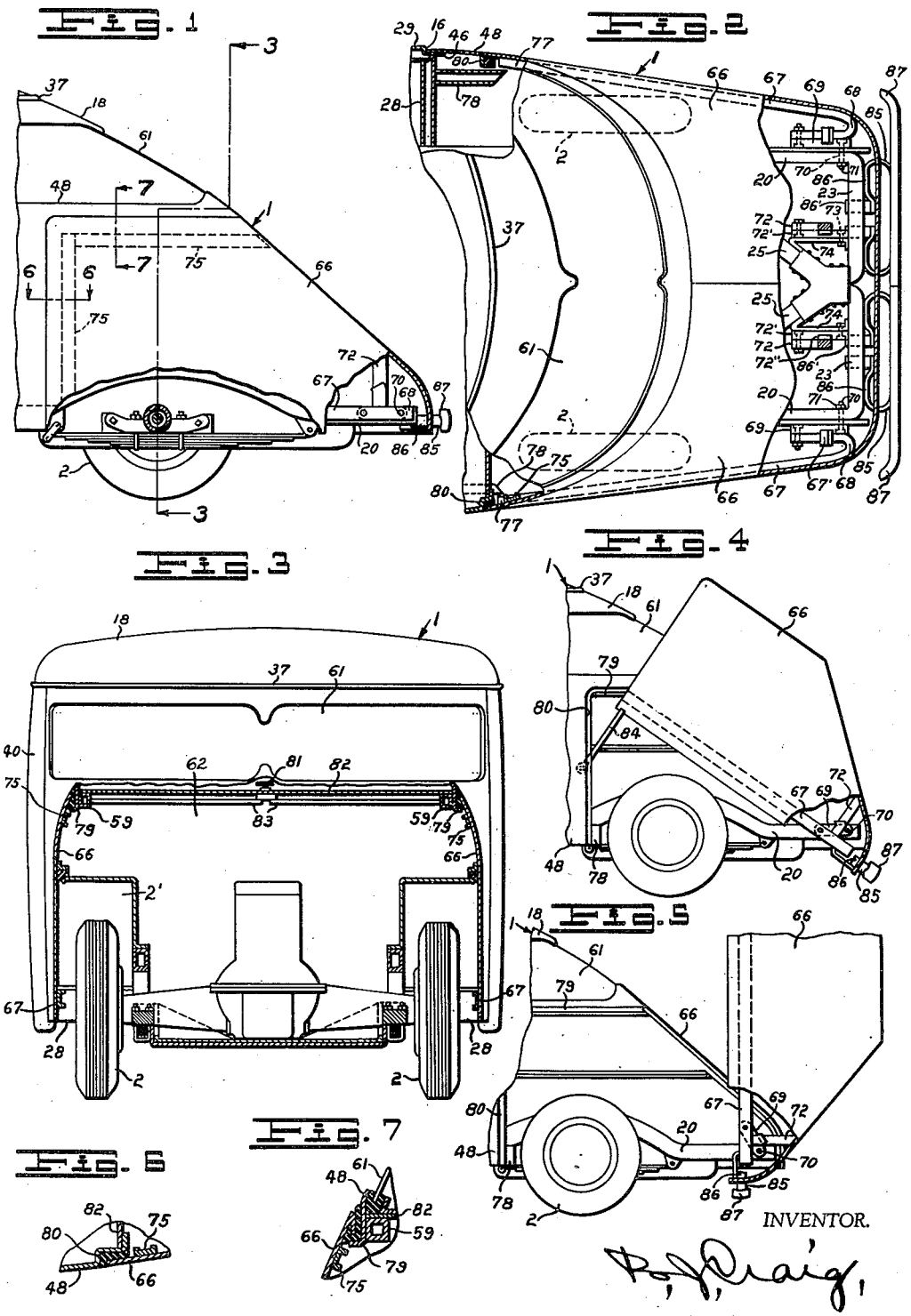
INVENTOR.
B. J. Craig Patented Aug. 17, 1948

2,447,397

UNITED STATES PATENT OFFICE 2,447,397

VEHICLE COMPARTMENT HOOD AND FENDER

Burnie J. Craig, Los Angeles County, Calif.

Original application February 12, 1940, Serial No. 318,397. Divided and this application April 25, 1944, Serial No. 532,652

3 Claims. (Cl. 180—69)

This invention relates to a vehicle compartment structure.

The general object of the invention is to provide an automotive vehicle including a body having a novel rear portion.

Another object of the invention is to provide a novel compartmental closure for a vehicle body.

An additional object of the invention is to provide a novel means for mounting a closure on a vehicle compartment.

A further object of the invention is to provide a vehicle compartment closure including a novel reinforcing member or bumper.

Other objects of the invention will be apparent from the following description taken in connection with the accompanying drawings, wherein:

Fig. 1 is a side elevation with the parts broken away and showing the rear portion of a vehicle equipped with the invention;

Fig. 2 is a top plan view of the rear part of the vehicle with parts broken away;

Fig. 3 is a section taken on line 3—3, Fig. 1;

Fig. 4 is a side elevation of the rear portion of the vehicle showing the rear hood raised to the first postion;

Fig. 5 is a view similar to Fig. 4 showing the hood in fully raised position, and Fig. 6 and Fig. 7 are enlarged, fragmentary sections taken on lines 6—6 and 7—7, respectively, Fig. 1.

This application is a division of application Serial No. 318,397, filed February 12, 1940, now Patent No. 2,349,940, granted May 30, 1944.

Referring to the drawing by reference characters, the invention is shown as embodied in an automotive vehicle which is indicated generally at 1. The vehicle includes wheels 2 arranged in wheel housings 2'. The wheels are suitably supported on a frame which includes side rails 20. The side-rails include hangers 28 which support outer rails 29. The outer rails support pillars 16 which in turn support a top 18.

The top includes a drain or trim strip 37 and the vehicle includes suitable doors 40. The pillars 16 include flanges 46 which support body panels 48. The frame includes a rearwardly directed member 59 (see Fig. 7), which is covered by an extension of the panel 48. The lowered edge of a window 61 is support on the panel 48.

The rear of the body includes a compartment 62 which is closed by a pair of hood members 66 (see Figs. 1, 2 and 4). Each hood member includes a side bumper member 67 which extends longitudinally of the compartment and is suitably secured in place and includes a bent over end portion 68 on which a link 69 is pivoted at one end. The other end of each link 69 is pivotally mounted on a removable pin 70 which is held in place by a nut 71. As will be later described, this construction provides two open positions for the hood members 66.

Each hood member further includes a bracket 72 on which one end of a link 72' is pivoted. The other end of the link 72' is pivoted on a removable pin 73 secured to a bracket 74 which latter is mounted on the members 23 and 25. The pins 70 and 73 are coaxial. The hood members each include vertical and lateral brace members 75.

The rear bent over portion of the bumper 67 engages the link 69 which in turn engages the rail 29 when the half-hood is closed while the forward end 77 of each bumper engages the outer end of a bracket 78 on the associated hanger 28. Thus the bumper under crash impact tends to transfer the blow directly to the frame.

Each hood member 66 when closed engages a flange 79 on the panel 48 and abuts against a shoulder 80 on the rear edge of the same panel 48. A latch 81 on a fire wall 82 supported on the members 59 is operable from within the vehicle and includes arms 83 which secure the hood members 66 in closed position. The edges of the fire wall 82 engage the panel 48. The fire wall is arranged to separate the engine compartment from the passenger compartment.

In the complete vehicle each half-hood covers the adjacent wheel 2. To allow access to and replacement of a tire the half-hood is raised to the position shown in Fig. 4 and may be held in this position by a bracket 84. When fully opened to allow access to the engine the hood assumes the position shown in Fig. 5 which position it holds due to the location of the axis of its pivoted support.

It will be seen that when lifted the hood first pivots about the forward pivots of the links 69 and 72'. When lifted further a tongue 67' secured to the bumper 67 engages the link 69 and a tongue 72" engages the link 72' and thereafter the hood pivots about the rear pivots of the links 69 and 72'. By removing the pins 70 and 73 the hood members may be completely removed to facilitate removal of, or repairs to, the engine or for other purposes.

Each hood member 66 includes a rear bumper support 85 which extends through the hood and has inner resilient portions 86 disposed when the hood is in down position as shown in Fig. 2, adjacent the half cross member 23 of the frame. The resilient portions 86 include end portions 86' which are bent so that they are beneath the member 23 when the hood member is closed. A rear bumper 87 is suitably secured to each support 85.

A blow on one of the bumpers 87 causes the latter to move inwardly so that the portions 86 thereon engage cross members 23 on the frame and transfer the blow to the frame members. The ampact of a rearward glancing blow on the end of a bumper is transferred to a member 23 through the bent portions 86'.

Having thus described my invention, I claim:

1. In an automotive vehicle, a body having a compartment therein, a closure for the compartment, a link, a pin fixed relative to the body and pivotally supporting one end of the link, other means to pivotally support the other end of the link on the closure, road wheels on said body and including a wheel behind the closure, the closure being movable about the other pivot means to a first raised position to expose the wheel, and means movable with the closure to engage the link and to move the link and closure about the first pivot when the closure is further raised, the pivot means being disposed to cause said closure to remain in the second position due to gravity.

2. An automotive vehicle including a body having an engine compartment at one end, a wheel housing at each side of the engine compartment, said body including a frame, road wheels mounted on the frame and arranged in the wheel housings, said engine compartment having an open upper portion, closure means for said engine compartment, said closure means comprising a pair of complemental closure members, each of the members including a top portion and a side portion, the side portion of each closure member forming a closure for the adjacent wheel housing, means to pivotally mount one end of each closure member on the body, the axis of the pivotal mounting being disposed between the wheel axle and the adjacent end of the vehicle, means to hold the closure members in fully closed position and other means operable either to hold each closure member in partly raised position to expose a wheel in said housing, or in fully opened position to permit ready access to an engine compartment.

3. An automotive vehicle including a body having an engine compartment at one end, a wheel housing at each side of the engine compartment, road wheels for the vehicle arranged in the wheel housings, said engine compartment having an open upper portion, closure means for said engine compartment, said closure means including a pair of closure members, each of the closure members including a top portion and a side portion, the side portion of each closure member forming a closure for the adjacent wheel housing, means to pivotally mount one end of each closure member on the body, the axis of each pivotal mounting being disposed substantially horizontal and extending transversely of the body and being disposed near said one end of the body and between the road wheel axis and the extreme end of said one end of the vehicle, means to hold the closure members in fully closed position and other means to hold the closure members in open position to permit ready access to an engine in the engine compartment.

BURNIE J. CRAIG,

REFERENCES CITED

The following references are of record in the file of this patent:

UNITED STATES PATENTS

| Number | Name | Date |
|---|---|---|
| D. 96,860 | Ryan | Sept. 10, 1935 |
| 1,434,929 | Taylor | Nov. 7, 1922 |
| 1,795,208 | Garner | Mar. 3, 1931 |
| 2,057,015 | Davis, Jr. | Oct. 13, 1936 |
| 2,080,989 | Smith | May 18, 1937 |
| 2,086,172 | Northup | July 6, 1937 |
| 2,091,076 | Langdon | Aug. 24, 1937 |
| 2,175,528 | Klavik | Oct. 10, 1939 |
| 2,196,225 | Morrison | Apr. 9, 1940 |
| 2,210,519 | Wollensak | Aug. 6, 1940 |
| 2,232,275 | Ronning | Feb. 18, 1941 |
| 2,237,677 | Lewis | Apr. 8, 1941 |
| 2,329,808 | Wolfe | Sept. 21, 1943 |

FOREIGN PATENTS

| Number | Country | Date |
|---|---|---|
| 476,100 | Great Britain | Dec. 1, 1937 |